United States Patent Office 3,516,972
Patented June 23, 1970

3,516,972
PROCESS FOR THE PREPARATION OF POLY-AMIDES IN FINELY DIVIDED FORM
Wolfgang Wolfes, Witten-Bommern, and Gustav Renckhoff, Witten (Ruhr), Germany, assignors to Chemische Werke Witten G.m.b.H., Witten (Ruhr), Germany
No Drawing. Filed Mar. 30, 1967, Ser. No. 626,949
Claims priority, application Germany, Apr. 1, 1966, D 49,755
Int. Cl. C08g 20/20
U.S. Cl. 260—78          8 Claims

ABSTRACT OF THE DISCLOSURE

The present disclosure relates to a process for the preparation of copolyamides of terephthalic and isophthalic acid with aliphatic dicarboxylic acids, said copolyamides being in finely divided form. More particularly, the present disclosure concerns a process for the preparation of coplyamides which comprises reacting a diester of an acid selected from the group consisting of isophthalic acid, terephthalic acid, and substituted derivatives thereof with the reaction product of an aliphatic dicarboxylic acid and an organic diamine. The resultant copolyamides are suitable for coating metals, for example, by a fluidized bed coating process. They are also suitable for use in injection molding and extruding processes.

BACKGROUND OF THE INVENTION

The present invention relates to a process for the preparation of copolyamides of terephthalic and isophthalic acid with aliphatic dicarboxylic acids, said copolyamides being in finely divided form. More particularly, the present invention concerns a process for the preparation of copolyamides which comprises reacting a diester of an acid selected from the group consisting of isophthalic acid, terephthalic acid, and substituted derivatives thereof with the reaction product of an aliphatic dicarboxylic acid and an organic diamine.

Polyamides of isophthalic and terephthalic acid, or mixtures of these two acids or derivatives of iso- and terephthalic acid or mixtures thereof in finely particulate form, can be prepared by reacting the diester of these acids, and/or the diesters of iso- and/or terephthalic acid substituted by one or several lower alkyl groups or by one or two halogen atoms, derived from reaction with phenol or with phenols substituted with one or more alkyl or benzyl groups, with approximately equivalent amounts of the primary aliphatic or alkaryl diamine in the presence of an aromatic hydrocarbon solvent, under thorough agitation and at temperatures of about 20° to 150° C. The thus obtained suspension of a preliminary condensate is subsequently recondensed by heating to a higher temperature which is just below the melting range of the polyamide. This higher temperature is generally in the range of about 170° to 350° C. The recondensation is continued until the desired degree of polymerization is obtained, if desired, under pressure, or by exchanging the original solvent with a higher-boiling nonsolvent for the polyamide.

In a similar process, aliphatic polyamides can be prepared wherein the diphenyl esters of aliphatic dicarboxylic acids are employed. If the above condensation processes are combined, it is also possible to produce copolyamides of terephthalic and/or isophthalic acid with aliphatic dicarboxylic acids in finely divided form. The diphenyl esters employed can be produced economically, particularly when they are obtained by the reesterification of the lower alkyl esters with phenols. This process is advantageous in those cases where the acids used therein are produced on a technical scale in the form of the lower alkyl esters thereof, as is the case in the manufacture of terephthalic and isophthalic acids. However, in most cases, aliphatic dicarboxylic acids are technically obtained as pure acids.

A process for the preparation of polyhexamethylene terephthalamide is well known wherein the respective salt is gently heated below the melting point until a high-polymeric polyamide is obtained. This process is restricted to those polyamides which are highly crystalline and have extraordinarily high melting points. In another known process for the production of polyamides, the salts used as the starting compounds are suspended in a non-solvent, and with gentle heating, the condensation is completed, with water being split off. The reaction takes place below the melting point of the polyamide to be produced. This process cannot be used when copolyamides are to be prepared which are composed of aromatic and aliphatic dicarboxylic acids.

Polyamides prepared from aromatic dicarboxylic acids are frequently too brittle for certain technical applications. By adding certain amounts of aliphatic dicarboxylic acids according to the process of the present invention, copolyamides can be produced which exhibit a substantial increase in elasticity when compared with polyamides made from aromatic dicarboxylic acids.

Accordingly, it is an object of the present invention to provide a process for the preparation of copolyamides of terephthalic and isophthalic acid with aliphatic dicarboxylic acids which overcomes the disadvantages and deficiencies of prior art methods.

Another object of the present invention is to provide a process for the preparation of copolyamides of terephthalic and isophthalic acid with aliphatic dicarboxylic acids, said copolyamides being in finely divided form, wherein said copolyamides exhibit a substantial increase in elasticity when compared with those prepared from aromatic dicarboxylic acids.

A further object of the present invention is to provide a process that yields the said copolyamides of terephthalic and isophthalic acid with aliphatic dicarboxylic acids with an assured, desired degree of polymerization.

A still further object of the present invention is to provide a process for the preparation of copolyamides of terephthalic and isophthalic acid with aliphatic dicarboxylic acids in finely divided form which may be carried out easily and simply and which avoids the shortcomings of prior art processes.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Summary of the invention

Polyamides of iso- and terephthalic acid or mixtures of these two acids may be obtained in a finely divided form by reacting the diesters of these acids, derived from reaction with phenol, with approximately equivalent amounts of a primary aliphatic or alkaryl diamine at temperatures of from about 20° to 150° C. in the presence of a solvent. According to the present invention, it has been found that finely divided copolyamides with up to about 50 molar percent of aliphatic dicarboxylic acids, having a specific viscosity of at least about 0.8 can be obtained, if, for condensation purposes, up to about 50 molar percent of the diamines are replaced by the reaction product of an aliphatic dicarboxylic acid with said amines in an organic solvent. Thus, according to the present invention, before the polycondensation with the diphenyl esters, one or more aliphatic dicarboxylic acids are reacted with the entire amount of diamine necessary for the polycondensation process, at a temperature of above about 150° C., and with water being split off. The reaction product is then reacted with the diesters of iso- and/or terephthalic acid in the presence of an aromatic hydrocarbon solvent, and at a temperature of about 20° to 150° C., with thorough agitation. The thus obtained suspension of a preliminary condensate is subsequently recondensed by heating to a higher temperature which is just below the melting point of the polyamide. This higher temperature is generally in the range of about 170° to 350° C.

The molar amount of the diamine is greater than or equal to the molar amount of the dicarboxylic acid. The molar amount of the diester is approximately equal to the difference between the molar quantities of the diamine and the dicarboxylic acid.

It is important that the preliminary condensation be complete. This is assured because due to the presence of an excess amount of diamine, the equilibrium is shifted in favor of the amide formation and, additionally, the condensation water is rapidly removed by azeotropic distillation. In order to completely remove the water, it is often advantageous to conduct the distillate over a drying agent, such as for example, potassium carbonate, before recycling the same into the reaction vessel.

Furthermore, it is also advantageous to select the temperature during the preliminary condensation sufficiently high so that the amino salts of the aliphatic dicarboxylic acids are melted. In most cases, upon increasing amidation, the preliminary condensates dissolve in the aromatics. When the solution is incomplete, the preliminary condensate must be emulsified to form the smallest of droplets, by vigorous agitation.

The allowable upper temperature limit for the subsequent condensation or recondensation is dependent upon the lower limit of the melting range of the polyamide since, otherwise, the polyamide particles will stick together, prohibiting the obtaining of a powdery product. This temperature limit may be easily determined by a preliminary test. The degree of polymerization can be varied by changing the temperature and the time of reheating, and molecular weights corresponding to a specific viscosity value of about 0.8 are required in order to obtain polyamides having usable and workable properties.

After the condensation has been completed, the finely divided or particulate polyamide is separated from the suspension and washed with a readily volatile agent, such as methanol. Thereafter, a further treatment may be carried out in a suitable apparatus, for example, a tumbler dryer, at an increased temperature, with the possible use of a vacuum, in order to remove the last traces of adhereing more volatile substances The diphenyl esters of iso- and/or terephthalic acid, and/or the corresponding esters of iso- and/or terephthalic acid substituted by one or more lower alkyl groups or by one or two halogen atoms, are particularly preferred in the process of the present invention. However, it is also possible to use the esters of these acids prepared from lower alkyl-substituted phenols. The term "lower alkyl" is meant to refer to alkyl groups containing less than 5 carbon atoms, such as methyl-, ethyl-, propyl-, buytl-, etc. With both the iso- and tetephthalic acid derivatives and the phenyl derivatives, there may be more than one alkyl group attached to the aromatic ring, such as the dimethyl, trimethyl, tetramethyl, diethyl, tetraethyl, tributyl, etc. derivatives. Halogen-substituted derivatives include those substituted by chloro-, bromo-, and fluoro- in the aromatic ring. One or two halogens, the same or different, may be contained in the ring, such as dichloro-, dibromo-, difluoro-, chlorofluoro-, chlorobromo-, monochloro-, monobromo-, etc. derivatives.

Thus, besides phenol, examples of alkyl-substituted phenols which may be used to form the ester function of the compound to be reacted with the diamine-aliphatic dicarboxylic acid reaction product include the isomeric cresols, xylenols, tert-butylphenols, etc. Moreover, in addition to iso- and terephthalic acid, compounds such as methylterephthalic acid, methylisophthalic acid, tert-butylisophthalic acid, chloroisophthatalic acid, dichloroterephthalic acid, etc. may be used as the acid component in forming the diesters. The diesters can be prepared according to conventional procedures. When using non-substituted diaryl esters together with diaryl esters having nuclear substituents in preparing the polyamides, the quantitative ratio thereof may be varied as desired within a wide range.

Suitable aliphatic dicarboxylic acids which are reacted with the diamines according to the process of the present invention are the customary acids employed for producing polyamides having about 2 to 10 carbon atoms. Suitable acids include, for example, oxalic acid, adipic acid, azelaic acid, sebacic acid, decanedicarboxylic acid, and dimerized fatty acids. Also included with these aliphatic dicarboxylic acids are those substituted by one or more lower alkyl groups or halogen atoms similarly as in the aromatic dicarboxylic acids. The aliphatic dicarboxylic acids can be used individually or in a mixture with one another.

Suitable diamine components of the present invention are the aliphatic, cycloaliphatic, or alkaryl diamines conventionally employed for the production of polyamides, such as for example, tetramethylenediamine, hexamethylenediamine, nonamethylenediamine, decamethylenediamine, dodecamethylenediamine, 2 - methyl-pentamethylenediamine, trimethyl-hexamethylenediamine, xylylenediamine, para-xylylenediamine, 4,4' - diamino - biscyclohexylmethane, 1-amino - 3 - aminomethyl-3,5,5-trimethyl-cyclohexane, etc.

The diester component and the diamine component are preferably reacted in approximately equivalent amounts. By equivalent amounts is meant that the number of ester groups to be reacted is approximately equal to the number of amino groups to be reacted.

Suitable solvents which can be used for the reaction between the aliphatic dicarboxylic acids and the diamines are aromatic hydrocarbons such as benzene, toluene, xylene, diethylbenzene, tetralin, diphenyl benzene, dodecylbenzene, etc. In order to establish a desired boiling point, it is often advantageous to employ mixtures of the above-mentioned solvents, or to operate under a pressure or under a vacuum. A particularly advantageous solvent is diethylbenzene. The boiling point of this solvent is about 180° C. At this temperature, amidation occurs from the salts very rapidly with water being split off. During the post-condensation of the diphenyl esthers of iso- and/or terephthalic acid, diethyl benzene forms an azeotrope with the liberated phenol, which can easily be separated by distillation. Additionally, the dissolving power of diethyl benezene is very good with respect to the product formed from the reaction of the aliphatic dicarboxylic acids with the diamines in the first stage.

Benezene is particularly suitable as the solvent for the primary reaction of the diester with the diamine, but other aromatic hydrocarbons, such as toluene, xylene, tetralin, diphenyl, etc., may also be employed. The subsequent further condensation or recondensation of the suspension of preliminary condensate at increased temperatures may take place in the same solvent. However, when employing low boiling solvents, the use of a pressure apparatus is required if the temperature of the recondensation is above the corresponding boiling point of the solvent. It may, therefore, be advantageous to exchange for the originally used solvent, another solvent which is highboiling and, in that case, it is expedient to choose a solvent whose boiling range coincides with the desired temperature of recondensation.

The thus obtained copolyamides of the present invention, because of their pulverulent state, can be readily dissolved in the conventional polyamide solvents and thus be further processed. However, they can also be directly employed for manufacturing purposes in injection molding or extruding machines, insofar as the polyamides are suitable therefor. Additionally, the polyamides are suitable for coating metals, in accordance with the fluidized bed coating process.

Description of the preferred embodiments

The present invention will become more fully understood with reference to the following examples which are given by way of illustration only and thus are not to be considered as limitive of the present invention.

The specific viscosity number of the polyamides set forth in the following examples for characterizing the degree of polymerization was determined by measuring the viscosity of a 1% polymer solution (1 gram of substance per 100 cc. of solution) in phenol/tetrachloroethane (60/40) in an Ostwald viscosimeter at a temperature of 25° C. The melting point ranges set forth were observed under a heated-table microscope.

EXAMPLE I 7.3 grams of adipic acid (0.05 mole) and 40.0 grams of dodecamethylene diamine (0.2 mole) is added to 300.0 ml. of diethyl benzene. The mixture is stirred and heated in a liter 3-necked flask provided with a stirrer, a water trap, a dropping funnel and a thermometer. A poorly crystallizing salt is obtained in suspension. The mixture is well agitated and rapidly heated to its boiling point. At a temperature of about 150° C., the amidation reaction takes place, with water being split off. The liberated water is quickly withdrawn at a temperature of about 180° C., together with the diethyl benzene vapors, and separated by means of a water trap. After one hour, the main quantity of water has been separated. Thereafter, the water trap is replaced by a water-cool conduit in which a Soxhlet tube filled with anhydrous potassium carbonate is inserted. The condensed diethyl benzene vapors are conducted, for one hour, through the drying tube and recycled into the reaction vessel. During the amidation, a slightly clouded solution is slowly formed. Under thorough stirring the solution is allowed to cool to about 150° C., and within 30 minutes, a solution of 47.7 grams of a diphenyl ester mixture (0.15 mole) of 70% terephthalic acid and 30% isophthalic acid in 100 ml. of diethyl benzene is added dropwise. A copolyamide powder precipitates immediately. In order to complete the condensation process, the reaction mixture is additionally stirred at the boiling temperature for three hours. After cooling to room temperature, the still finely particulate polyamide is vacuum filtered, washed with methanol, and dried. The last traces of the volatile components are removed by heating at a temperature of 190° C. under a vacuum. The specific viscosity of the copolyamide powder product is 1.95 and the melting point range is about 235–250° C.

EXAMPLE II

The condensation is conducted in the same apparatus as described in Example I. 9.4 grams of azelaic acid (0.05 mole) are heated, together with 31.6 grams of nonamethylenediamine (0.2 mole) in a mixture of 300 ml. dodecylbenzene and 30 ml. of benzene to a temperature of 160° C., the reaction mixture being well agitated. At this temperature, the benzene boils, with vigorous reflux via a water trap. After about 1.5 ml. of water have been separated, the condensed benzene is recycled, as described in Example I, via a drying tube into the flask. After three hours, a clouded solution forms. To this solution is added in a dropwise manner a heated solution of 47.7 grams of a diphenyl ester mixture (0.15 mole) of 70% terephthalic acid and 30% isophthalic acid in 100 ml. of dodecylbenzene. The polyamide precipitates at once in the form of a powder. The suspension is then additionally condensed for three hours at 190° C. This temperature can be easily set by withdrawing, under constant boiling, the exact amount of benzene permitting the sump temperature to rise to 190° C. The copolyamide powder is isolated and purified as described in Example I, and has a specific viscosity of 3.71 and a melting point range of about 253 to 265° C.

EXAMPLE III

Under the same conditions as set forth in Example I, 9.2 grams of dodecanedicarboxylic acid (0.04 mole) are reacted with 31.6 grams of nonamethylenediamine (0.2 mole) in 300 ml. of diethyl benzene. The reaction product thus obtained is added dropwise to a hot solution of 50.88 grams of diphenyl terephthalate (0.16 mole) in 100 ml. of diethyl benzene. The copolyamide powder which precipitates is additionally post-condensed in an autoclave at 230° C. for three hours. The copolyamide is then isolated and subjected to a post-treatment, as described in Example I. The specific viscosity value of the copolyamide is 2.08 and its melting point range is about 260 to 270° C.

EXAMPLE IV

Similarly as in Example III, 50 mole percent decanedicarboxylic acid is reacted with nonamethylene diamine in diethyl benzene, and polycondensed with 50 mole percent diphenyl terephthalate. The reaction mixture is condensed for three hours at a reflux temperature. The specific viscosity value of the resulting copolyamide is 1.55 and the melting point range is about 220 to 235° C.

EXAMPLE V

Similarly as in Example I, a mixture of 2.52 grams of oxalic acid (0.02 mole) and 9.20 grams of decane dicarboxylic acid (0.04 mole) is reacted with 40 grams of dodecamethylenediamine (0.2 mole) in 300 ml. of diethyl benzene, at the boiling temperature. The reaction product is polycondensed with 44.5 grams of diphenyl terephthalate (0.14 mole). The specific viscosity value of the copolyamide is 1.15 and the melting range is about 245 to 255° C.

EXAMPLE VI

Similarly as in Example I, 12.2 grams of a dimeric fatty acid (acid number=184; 0.02 mole) are amidated with 23.2 grams of hexamethylene diamine (0.2 mole) in 300 ml. of diethyl benzene. A yellow-colored clear solution is obtained. To this solution is added, dropwise at 80° C., a solution of 57.24 grams of diphenyl ester mixture (0.18 mole) of 40% terephthalic acid and 60% isophthalic acid in 100 ml. diethyl benzene. The copolyamide powder precipitates almost immediately. The suspension is additionally condensed for three hours at 180° C. under thorough agitation. The specific viscosity value cannot be determined since the polyamide is already partially crosslinked. The polycondensate character of this compound can be observed by melting a sample of the powder. A dark yellow, very viscous powder is obtained with a softening point range of about 220° to 235° C.

EXAMPLE VII

Similarly as in Example I, 12.2 grams of a dimeric fatty acid (acid number=184; 0.02 mole) and 2.52 grams of oxalic acid (0.02 mole) are amidated with 40.0 grams of dodecamethylenediamine (0.2 mole) in 300 ml. of diethyl benzene. A yellow, clear solution is obtained. At 140° C. and with thorough agitation, a solution of 50.9 grams of diphenyl ester mixture (.016 mole) of 70% terephthalic acid and 30% isophthalic acid in 100 ml. of diethyl benzene is added dropwise. A copolyamide powder precipitates. The suspension is post-condensed under thorough agitation at 180° C. for three hours. Since, in this example, there is likewise obtained a slightly crosslinked copolyamide, only the high degree of viscosity of the molten powder permits the conclusion that this compound has a polymeric structure. The softening range of this copolyamide is about 230° to 255° C.

EXAMPLE VIII

Similarly as shown in Example I, 9.2 grams of dodecanedicarboxylic acid (0.04 mole) are amidated with a mixture of 28.0 grams of dodecamethylene diamine (0.14 mole) and 10.2 grams of 1-amino-3-aminomethyl-3,5,5-trimethyl-cyclohexane (0.06 mole) in 400 ml. of diethyl benzene. Thereafter, 50.80 grams of diphenyl terephthalate (0.16 mole) are added and condensed for four hours at 165° C. The thus obtained copolyamide powder is isolated and subjected to a post-treatment as described in Example I. The specific viscosity value of the copolyamide powder is 1.2 and the melting point range is about 225 to 235° C.

EXAMPLE IX

As set forth in Example I, 7.3 grams of adipic acid (0.05 ml.) are amidated with a diamine mixture of 30.0 grams of dodecamethylene diamine (0.15 mole) in 6.8 grams of para-xylenediamine (0.05 mole) in a mixture of 100 ml. of xylene and 200 ml. of diethyl benzene. At a reaction temperature of 155° C., the thus produced water is withdrawn from the reaction cycle. After three hours, there is added dropwise a solution of 47.7 grams of diphenyl ester mixture (0.15 mole) of 70% terephthalic acid and 30% isophthalic acid in 100 ml. of diethyl benzene. After the polyamide powder has been precipitated, the reaction mixture is subjected to a post-condensation process in an agitated autoclave for three hours at 170° C. The precipitated copolyamide powder has a specific viscosity value of 0.965 and a melting point range of about 240 to 255° C.

In connection with all of the copolyamides set forth in Examples I–IX described above, an attempt was made to condense the copolyamides from the salts in an inert suspension agent (aromatic and aliphatic hydrocarbons were selected) by employing condensation temperatures below the melting point of the starting salts and of the polyamides to be obtained. In all cases, the salts sintered together and formed viscous-smeary coatings on the wall of the flask and on the stirrer, after only a fraction of the stoichiometric amount of water had been distilled off.

The upper limit of the molar proportion of the aliphatic dicarboxylic acid is about 50%. Above this amount, oligomeric amides are formed which precipitate and form gluey coatings on the wall of the flask.

The invention being thus described, it will be obvious that the same may be varied in many ways. Such variations are not to be regarded as a departure from the spirit and scope of the invention and all such modifications as would be obvious to one skilled in the art are intended to be included herein.

What is claimed is:

1. A process for the preparation of copolyamides in finely divided form which comprises first reacting in an inert organic solvent, a diamine selected from the group consisting of primary aliphatic diamines and primary alkaryl diamines with an aliphatic dicarboxylic acid having from about 2 to 10 carbon atoms, or an alkyl-substituted or halogen-substituted derivative thereof wherein the molar amount of said diamine is greater than or equal to twice the molar amount of said dicarboxylic acid to form an amide containing reaction mixture which is soluble in said organic solvent, then reacting a diester of an acid selected from the group consisting of isophthalic acid, terephthalic acid, alkyl-substituted isophthalic acids, alkyl-substituted terephthalic acids, halogen-substituted isophthalic acids, halogen-substituted terephthalic acids and mixtures thereof in a molar amount approximately equal to the difference between the molar quantities of the diamine and the dicarboxylic acid with the amide containing reaction mixture in an inert aromatic hydrocarbon solvent at a temperature of from about 20° to 150° C. to form a precipitate of a preliminary copolyamide condensate, and subsequently recondensing said preliminary copolyamide condensate to form a finely divided copolyamide by heating said preliminary copolyamide to a temperature just below the melting point of said finely divided copolyamide until the copolyamide has a specific viscosity of at least about 0.8 determined by measuring the viscosity of a 1% polymer solution (1 gram of substance per 100 cc. of solution) in phenol/tetrachloroethane (60/40) in an Ostwald viscosimeter at a temperature of 25° C.

2. The process of claim 1, wherein the aliphatic dicarboxylic acids and substituted derivatives thereof are reacted with the diamine at a temperature above about 150° C., with water being split off.

3. The process of claim 1, wherein the recondensation is carried out under pressure.

4. The process of claim 1, wherein during the recondensation said hydrocarbon solvent is replaced by a non-solvent for the polyamide.

5. The process of claim 4, wherein said non-solvent is higher boiling than said solvent.

6. The process of claim 1, wherein said diester is diphenyl isophthalate and said diamine is hexamethylenediamine.

7. The process of claim 1, wherein said diester is diphenyl terephthalate and said diamine is hexamethylenediamine.

8. The process of claim 1, wherein said preliminary copolyamide condensate is recondensed by heating at a temperature of from about 170° to 350° C.

References Cited

UNITED STATES PATENTS

| | | | |
|---|---|---|---|
| 2,987,507 | 9/1961 | Levine | 260—78 |
| 3,194,794 | 7/1965 | Caldwell et al. | 260—78 |
| 3,232,909 | 2/1966 | Werner | 260—78 |
| 3,379,695 | 4/1968 | Wolfes et al. | 260—78 |

HAROLD D. ANDERSON, Primary Examiner

U.S. Cl. X.R.

260—18, 95